(12) United States Patent
Leng (10) Patent No.: US 7,681,794 B2
(45) Date of Patent: Mar. 23, 2010

(54) POWER SUPPLY APPARATUS WITH IMAGE SCANNING FUNCTION

(75) Inventor: Yao-Shih Leng, Taipei (TW)

(73) Assignee: Micro-Star Int'l. Co. Ltd., Taipei (TW)

( * ) Notice: Subject to any disclaimer, the term of this patent is extended or adjusted under 35 U.S.C. 154(b) by 603 days.

(21) Appl. No.: 11/633,328

(22) Filed: Dec. 4, 2006

(65) Prior Publication Data
US 2007/0147711 A1 Jun. 28, 2007

(30) Foreign Application Priority Data
Dec. 23, 2005 (TW) .............................. 94146225 A (51) Int. Cl.
*G06K 7/10* (2006.01)
*G06K 9/22* (2006.01)
(52) U.S. Cl. .............. 235/454; 235/462.45; 235/472.01
(58) Field of Classification Search ................. 235/441, 235/451, 454, 462.45, 472.01
See application file for complete search history.

(56) References Cited

U.S. PATENT DOCUMENTS

| | | | | |
|---|---|---|---|---|
| 6,715,680 | B2* | 4/2004 | Sabella et al. | 235/449 |
| 6,789,734 | B1* | 9/2004 | Tu | 235/441 |
| 6,944,782 | B2* | 9/2005 | von Mueller et al. | 713/320 |
| 7,019,420 | B2* | 3/2006 | Kogan et al. | 307/150 |
| 7,054,148 | B2* | 5/2006 | Chen et al. | 361/679.4 |
| 7,430,674 | B2* | 9/2008 | von Mueller et al. | 713/300 |
| 2005/0139675 | A1* | 6/2005 | An et al. | 235/462.24 |

FOREIGN PATENT DOCUMENTS

| | | |
|---|---|---|
| JP | 2005018364 A | 1/2005 |
| TW | 356259 | 11/1997 |
| TW | 335940 | 7/1998 |
| TW | 547694 | 3/2002 |
| TW | 587744 | 4/2003 |

* cited by examiner

*Primary Examiner*—Thien M. Le
*Assistant Examiner*—April A Taylor
(74) *Attorney, Agent, or Firm*—Morris, Manning & Martin LLP; Tim Tingkang Xia (57) ABSTRACT

A power supply apparatus with image scanning function is provided. The power supply apparatus is installed to a portable electronic device to supply power and scan documents, and it is also able to be handheld independently to scan documents. The power supply apparatus includes a battery pack and a scanning module. The battery pack supplies power to an electronic device electrically connected thereto and supplies power to the scanning module. The scanning module scans an object to be scanned and converts image into image data. Thus, the portable electronic device obtains the image data of the object to be scanned.

9 Claims, 9 Drawing Sheets

POWER SUPPLY APPARATUS WITH IMAGE SCANNING FUNCTION

CROSS-REFERENCE TO RELATED APPLICATIONS

This non-provisional application claims priority under 35 U.S.C. §119(a) on Patent Application No(s). 094146225 filed in Taiwan, R.O.C. on Dec. 23, 2005, the entire contents of which are hereby incorporated by reference.

BACKGROUND OF THE INVENTION

1. Field of Invention

The present invention relates to a power supply apparatus, and more particularly to a power supply apparatus integrated with a scanning module.

2. Related Art

Along with the popularization of portable electronic devices, such as mobile phones, PDAs, and laptop computers, not only the processing and application of electronic data but also the life style and working mode of people have been greatly changed. With these portable electronic devices capable of processing data anytime and anywhere and the mature wireless communication networks, the era of mobile commerce comes. As for the mode of mobile commerce, laptop computers can store a large quantity of information, process and execute various types of information, and can be used with a projector to give presentation. Therefore, the laptop computers have become necessary tools for businessmen. For example, during meetings of most enterprises, participants often take laptop computers with them to input or share information anytime, and thus almost all information exchange is electrical. However, paper documents are still required in many occasions, and the most convenient way to convert the paper documents to electronic information is to scan the documents with a scanner. Currently, scanners are classified into desktop scanners and handheld scanners. When a scanner is used to scan paper documents, the scanner must be connected to a power source and connected to a laptop computer with a transmission line. However, it is inconvenient to the mobile commerce for businessmen. Moreover, though the handheld scanner is smaller than the desktop scanner in size and is convenient to carry, an additional device must be carried, which is an additional burden to mobile commerce dealers.

In order to solve this problem, Taiwan Patent Publication No. 356259, Taiwan Patent Publication No. 547694, and Taiwan Patent Publication No. 587744 provide laptop computers having a scanning apparatus. For example, a flatbed scanner disclosed in Patent No. 356259 is added with a flat panel display, a keyboard, and a computer host, so that the flatbed scanner and a laptop computer are integrated as whole. However, Patent No. 356259 uses the flatbed scanner as a main architecture, which results in a heavy weight and large volume in practice. Thus, it is difficult to implement this concept. A handheld scanner disclosed in Patent No. 547694 is assembled on a laptop computer. Accordingly, the laptop computer must have a corresponding mechanical design such as an accommodation slot matching the handheld computer (the corresponding accommodation slot is opened in the monitor as disclosed in Patent No. 547694) and a corresponding electronic design such as a power supply loop for providing power required by the handheld scanner and a signal loop for signal transmission. Currently, laptop computers are quite mature electronic devices, while Patent No. 547694 must change the original design of laptop computers substantially, which definitely incurs the increase of cost and may not be adopted by laptop computer designers and manufacturers. In addition, the design of the laptop computer with a scanning function of Patent No. 587744 also changes the original design of laptop computer substantially (including the mechanical and electronic parts), so it is still difficult to implement this design.

SUMMARY OF THE INVENTION

To a mobile commerce dealer, there is a demand for a laptop computer having scanning function. However, in the related art disclosed in the aforementioned patents, the volume and weight are increased, or the original design of the mechanical and electronic parts of the laptop computer is changed. Thus, those patents are difficult to be implemented in practice. Therefore, the present invention provides a power supply apparatus having scanning function that can be integrated with a laptop computer.

The power supply apparatus of the present invention is installed into a portable electronic device for supplying power and scanning images. The power supply apparatus includes a battery pack, a power connector, a signal connector, a scanning module, and a transmission assembly. The power supply device is installed into a battery slot of the portable electronic device to supply power and to scan, wherein a power connector and a signal connector of the power supply device are electrically connected to a power connection port and a communication port of the portable electronic device respectively. The scanning module is provided for scanning an object to be scanned and converting an image of the object into image data, and the scanning module is connected to the signal connector, so as to be electrically connected to the portable electronic device via the communication port. The battery pack is electrically connected to the power connector, so as to be electrically connected to the power connection device and supplies power to the portable electronic device, the scanning module, and the transmission assembly. A moving path for the object to be scanned to pass through is defined between the power supply apparatus and an inner side of the battery slot of the portable electronic device. The transmission assembly drives the object to be scanned moving along the moving path and passing through the scanning module, so as to perform scanning. And the scanning module converts the image of the object to be scanned to image data and transmits the image data to the portable electronic device.

The power supply apparatus of the present invention can be used as a handheld scanner independently, or can be installed into a portable electronic device to enable the portable electronic device to perform the scanning. When the power supply apparatus of the present invention is actually applied in the portable electronic device, the mechanical or electronic design of the portable electronic device will not be changed substantially, and the volume and weight of the portable electronic device will not be increased. Thus, the power supply apparatus of the present invention is an optimal design to meet the scanning requirements of portable electronic devices.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

The power supply apparatus for image scanning of the present invention refers to a secondary battery that can be installed into a portable electronic device to supply power. The portable electronic device is an electronic device that is convenient to carry and capable of processing information, such as a laptop computer or a tablet personal computer. In the detailed description of the present invention below, a laptop computer is taken as a preferred embodiment of the present invention.

Figure 1:
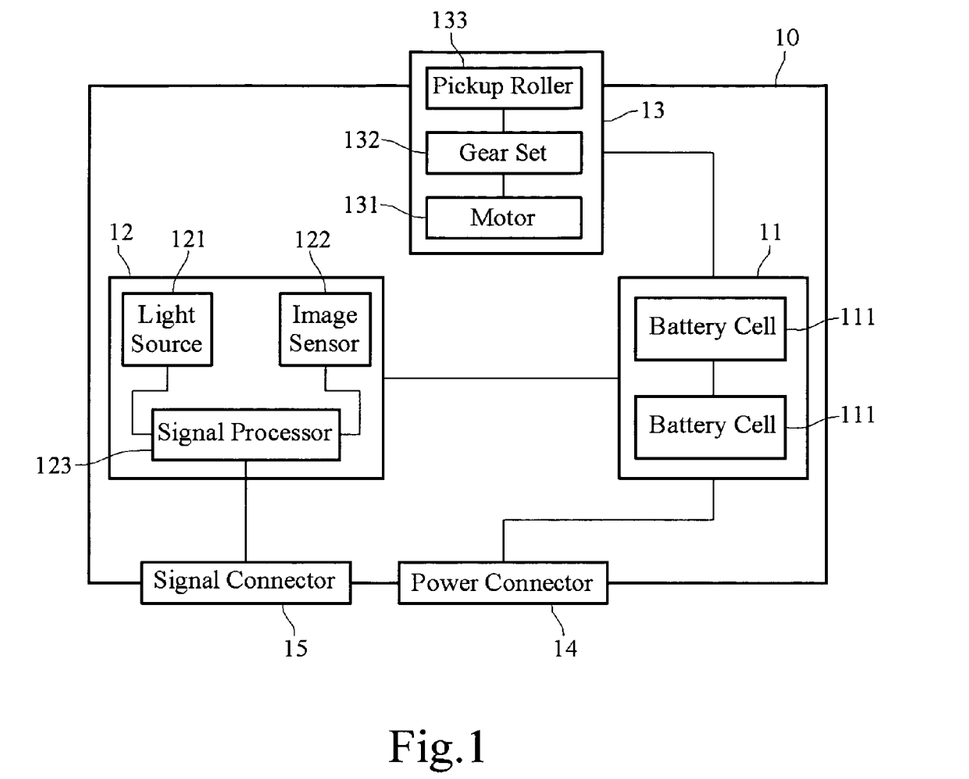
FIG. 1 is a schematic block diagram of a first embodiment of the present invention.

Referring to FIG. 1, a power supply apparatus 10 of a first embodiment of the present invention includes a battery pack 11, a scanning module 12, a transmission assembly 13, a power connector 14, and a signal connector 15. The battery pack 11 is a NiMH battery or a lithium-ion battery, which is composed of one or more battery cells 111, and the amount of power provided the battery pack 11 is determined by the number of the battery cells 111.

Figure 5A:
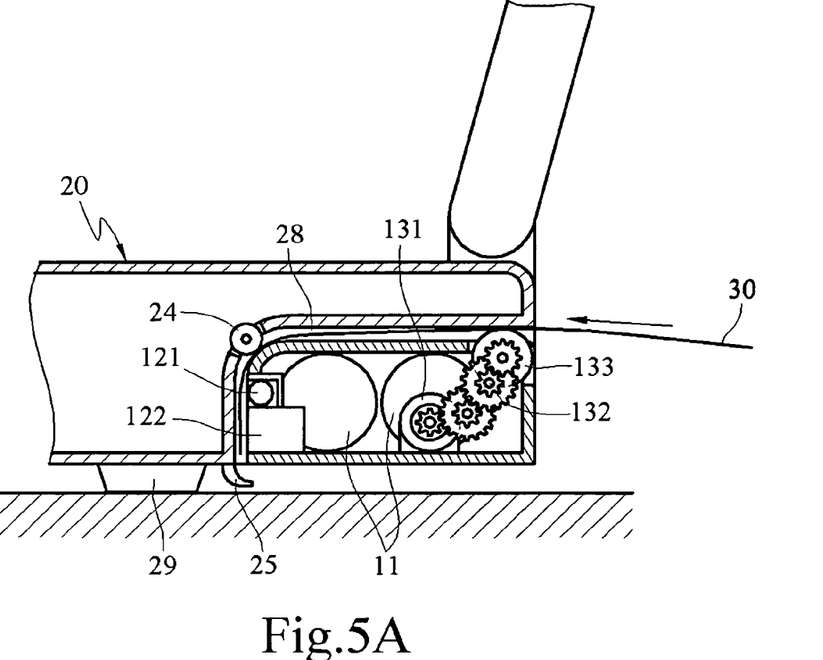
FIGS. 5A and 5B are sectional view s of the operations of the first embodiment of the present invention applied in a portable electronic device.

The scanning module 12 includes a light source 121, an image sensor 122, and a signal processor 123. The light source 121 projects light onto an object to be scanned 30 (as shown in FIG. 5A). The image sensor 122 is a charge coupled device (CCD) or a contact image sensor (CIS), and the light reflected by the object to be scanned 30 enters the image sensor 122. The light entering the image sensor 122 is converted into an electric signal. The signal processor 123 converts the analog electric signals of the image sensor 122 into digital signals, so as to generate digital image data. The signal processor 123 and the signal connector 15 are electrically connected.

The transmission assembly 13 includes a motor 131, a gear set 132, and a pickup roller 133. The motor is electrically connected to and powered by the battery pack 11. The gear set 132 is engaged with the motor 131 and the pickup roller 133. The motor 131 is powered to rotate and drives the gear set 132 to rotate the pickup roller 133.

The battery pack 11 is electrically connected to a power connector 14, the scanning module 12, and the transmission assembly 13 respectively, such that the power of the battery pack 11 is transmitted to the power connector 14, the scanning module 12, and the transmission assembly 13.

Figure 2:
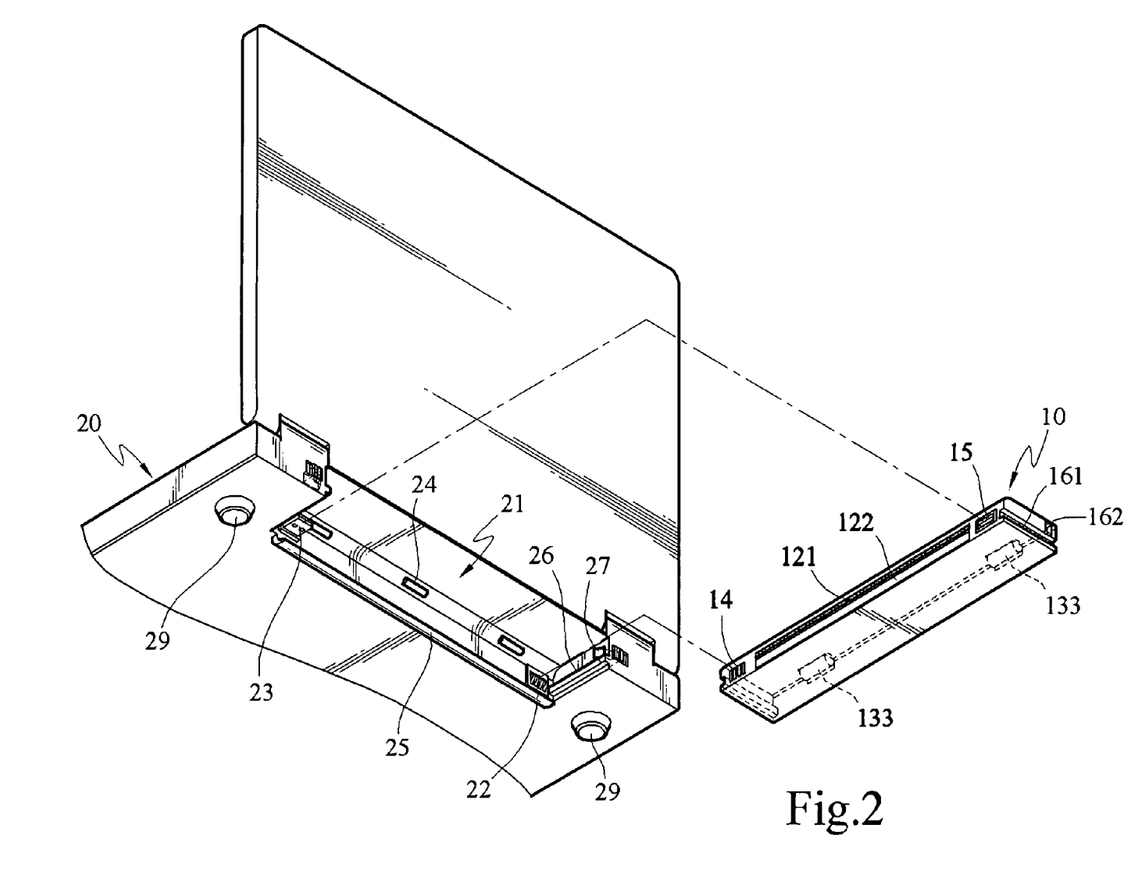
FIG. 2 is a schematic view of the first embodiment of the present invention applied in a portable electronic device.
Figure 3:
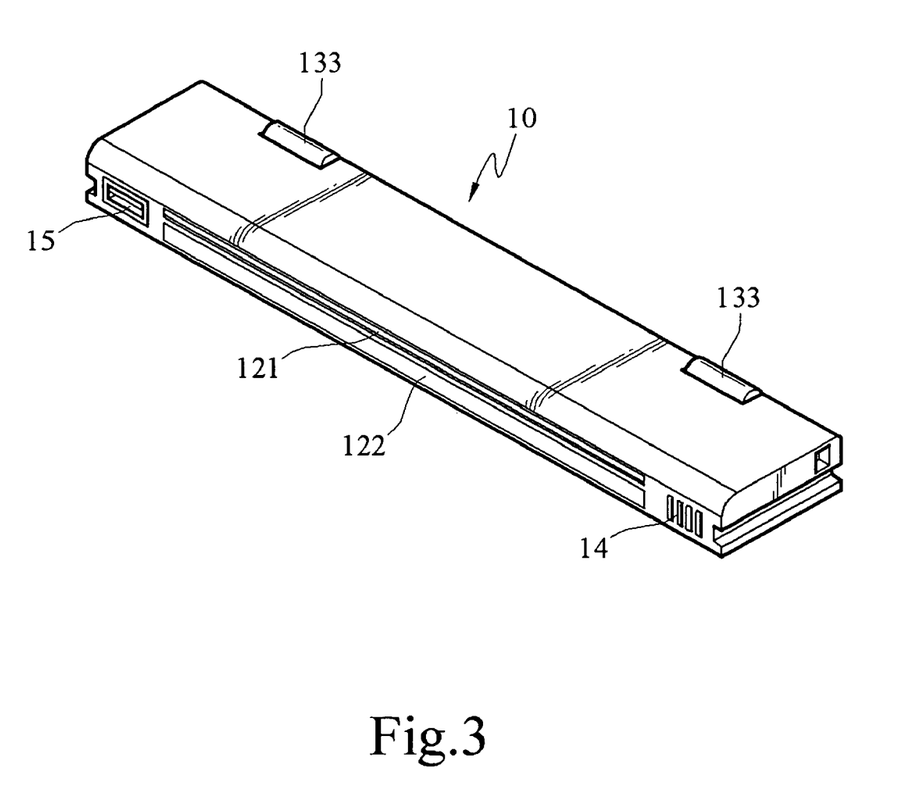
FIG. 3 is a perspective view of the first embodiment of the present invention.

Referring to FIGS. 2 and 3, the power supply apparatus of the first embodiment of the present invention is installed into a portable electronic device 20, so as to provide the power required by the portable electronic device 20. The portable electronic device includes at least one battery slot 21. At least has a power connection port 22 and a communication port 23 are disposed on a inner side of the battery slot 21, and a plurality of wheels 24 is disposed at the junction of the inner side. Moreover, a guide plate 25 is disposed at the bottom end, and combination ribs 26 and movable buckles 27 are disposed on the sidewalls at both sides of the battery slot 21. The volume of the power supply apparatus 10 is appreciably less than the volume of the battery slot 21, such that the power supply apparatus 10 is installed in the battery slot 21. Combination slots 161 and buckle openings 162 are arranged at both sides of the power supply apparatus 10, and the power connector 14, the signal connector 15, the light source 121, and the image sensor 122 are disposed on the same side of the power supply apparatus 10. A part of the pickup roller 133 is exposed at an appropriate position on a top surface of the power supply apparatus 10. The power supply apparatus 10 slides into the combination ribs 26 along the combination slots 161, such that the buckles 27 extend into the buckle openings 162. Thus, the power supply apparatus 10 is installed and fixed to the portable electronic device 20, and will not be easily detached from the portable electronic device 20. Meanwhile, the power connector 14 and the signal connector 15 of power supply apparatus 10 are electrically connected to the power connection port 22 and the communication port 23 of the portable electronic device 20 respectively.

Figure 4:
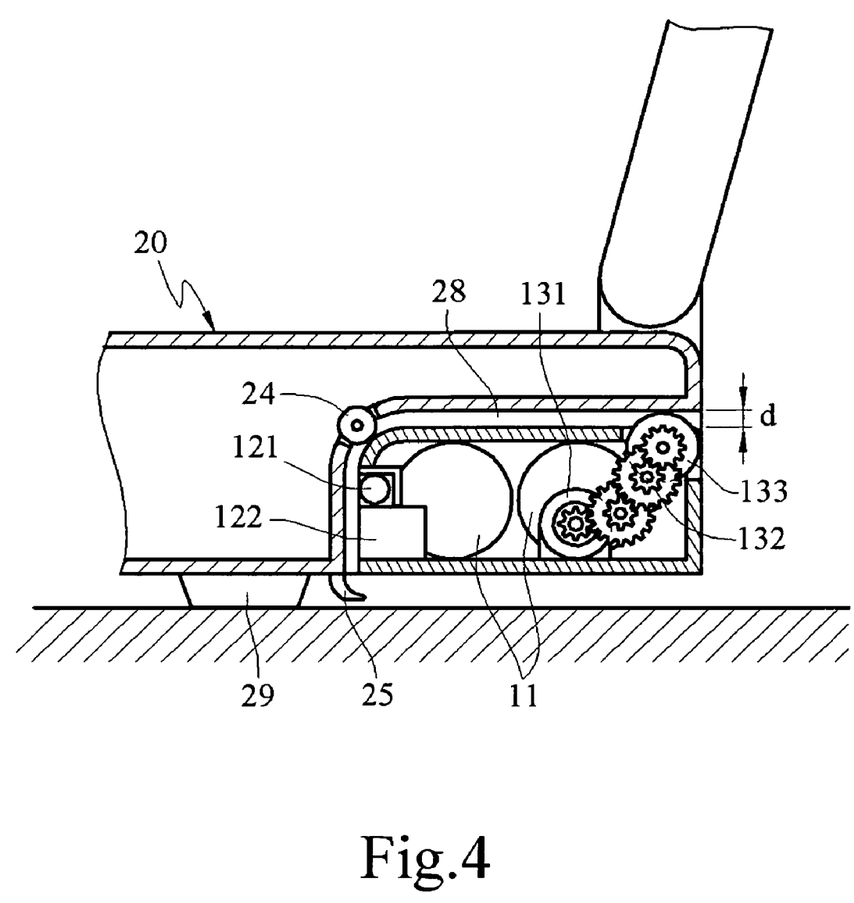
FIG. 4 is a sectional view of the first embodiment of the present invention applied in a portable electronic device.

Referring to FIG. 4, the power supply apparatus 10 is installed into the battery slot 21 of the portable electronic device 20. A gap d is arranged between the power supply apparatus 10 and the inner side of the battery slot 21, such that a moving path 28 is defined between the power supply apparatus 10 and the inner side of the battery slot 21. Foot supports 29 are disposed on the bottom of the portable electronic device 20 to support the portable electronic device 20, such that a height difference is formed between the portable electronic device 20 and the plane where the portable electronic device 20 is placed. Thus, the object to be scanned 30 can be moved out easily.

Figure 5B:
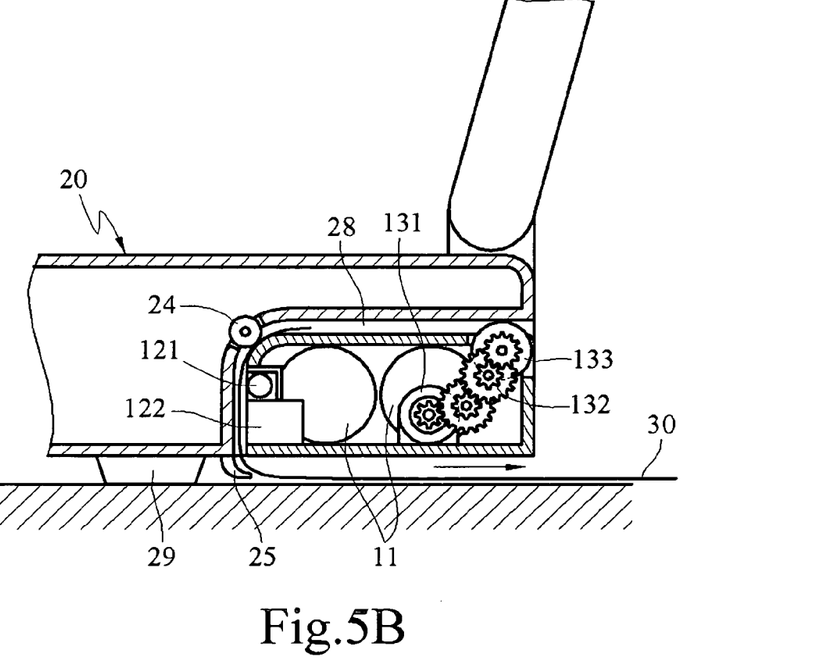

Referring to FIGS. 5A and 5B, when a scanning demand from the portable electronic device 20 is received, the light source 121 of the scanning module 12 is turned on, the motor 131 of the transmission assembly 13 starts to rotate and drives the gear set 132 to rotate the pickup roller 133. When the object 30 to be scanned which is sheet-like (e.g., a paper sheet) is placed into the moving path 28, the pickup roller 133 drives the object to be scanned 30 to move along the moving path 28. The wheels 24 in the battery slot 21 also guide the object 30 to be scanned, such that the object 30 to be scanned moves forward smoothly. When the object 30 to be scanned passes through the image sensor 122, the image sensor 122 scans the object 30 to be scanned. Then the object 30 to be scanned is guided by the guide plate 25 to move towards the rear end of the portable electronic device. When the scanning is complete, the signal processor 123 sends captured image data to the portable electronic device 20 via the signal connector 15 and the communication port 23 for storage or editing.

Figure 6:
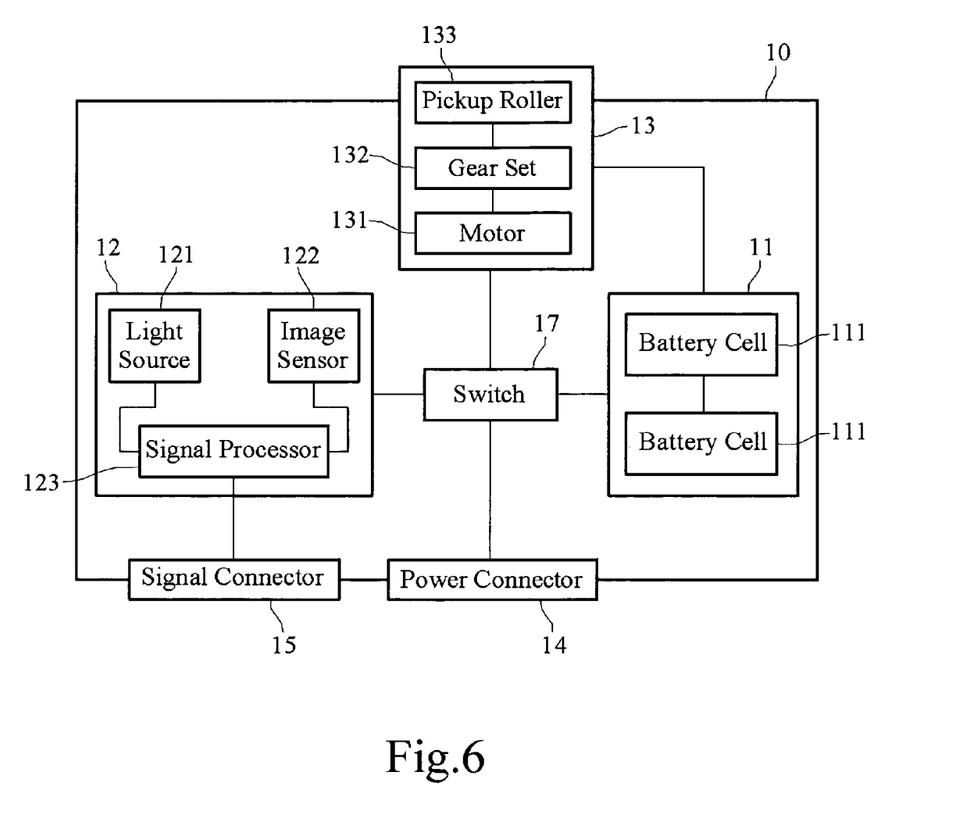
FIG. 6 is a schematic block diagram of a second embodiment of the present invention.

FIG. 6 illustrates a second embodiment of the present invention. A switch 17 is disposed among the battery pack 11, the scanning module 12, the transmission assembly 13, and the power connector 14. The switch 17 is a multi-directional switching switch. The switch 17 permits the battery pack 11 to transmit power to the power connector 14, the scanning module 12, and the transmission assembly 13 at the same time, or switches off the power supplied to the scanning module 12 and the transmission assembly 13, or transmits the power from the portable electronic device 20 to the battery pack 11, the scanning module 12, and the transmission assembly 13. After the power supply apparatus 10 is installed into the portable electronic device 10, if no scanning is required, the loop of the scanning module 12 and the transmission assembly 13 is cut off to avoid the consumption of power of the battery pack 11. Or, if the portable electronic device 20 is connected to can external power source (not shown) via a transformer (not shown), the power from the portable electronic device 20 charges the battery pack 11, or supplies the power required by the scanning module 12 and the transmission assembly 13.

Figure 7:
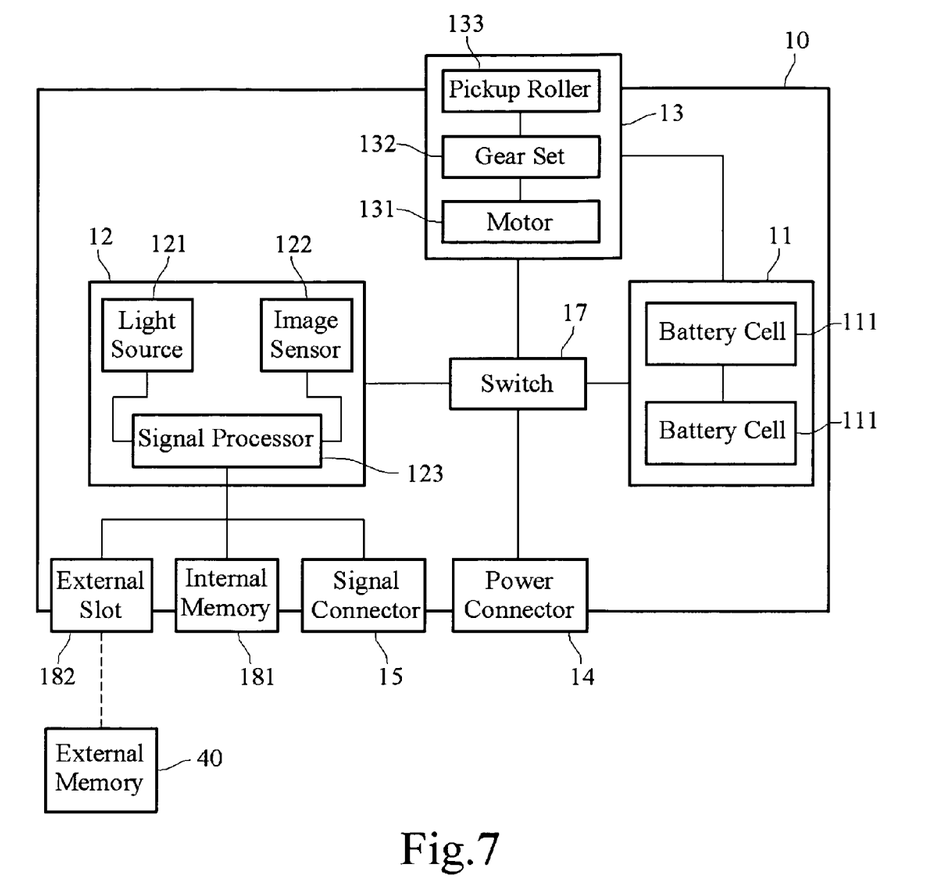
FIG. 7 is a schematic block diagram of a third embodiment of the present invention.

FIG. 7 illustrates a third embodiment of the present invention. An internal memory 181 and an external slot 182 are electrically connected to the signal processor 123 of the scanning module 12. The signal processor 123 transmits the image data after being scanned to the portable electronic device 20 via the signal connector 15 and the communication port 23 for storage and editing, or the image data is directly stored into the internal memory 181 or into an external memory 40 connected to the external slot 182.

Figure 8:
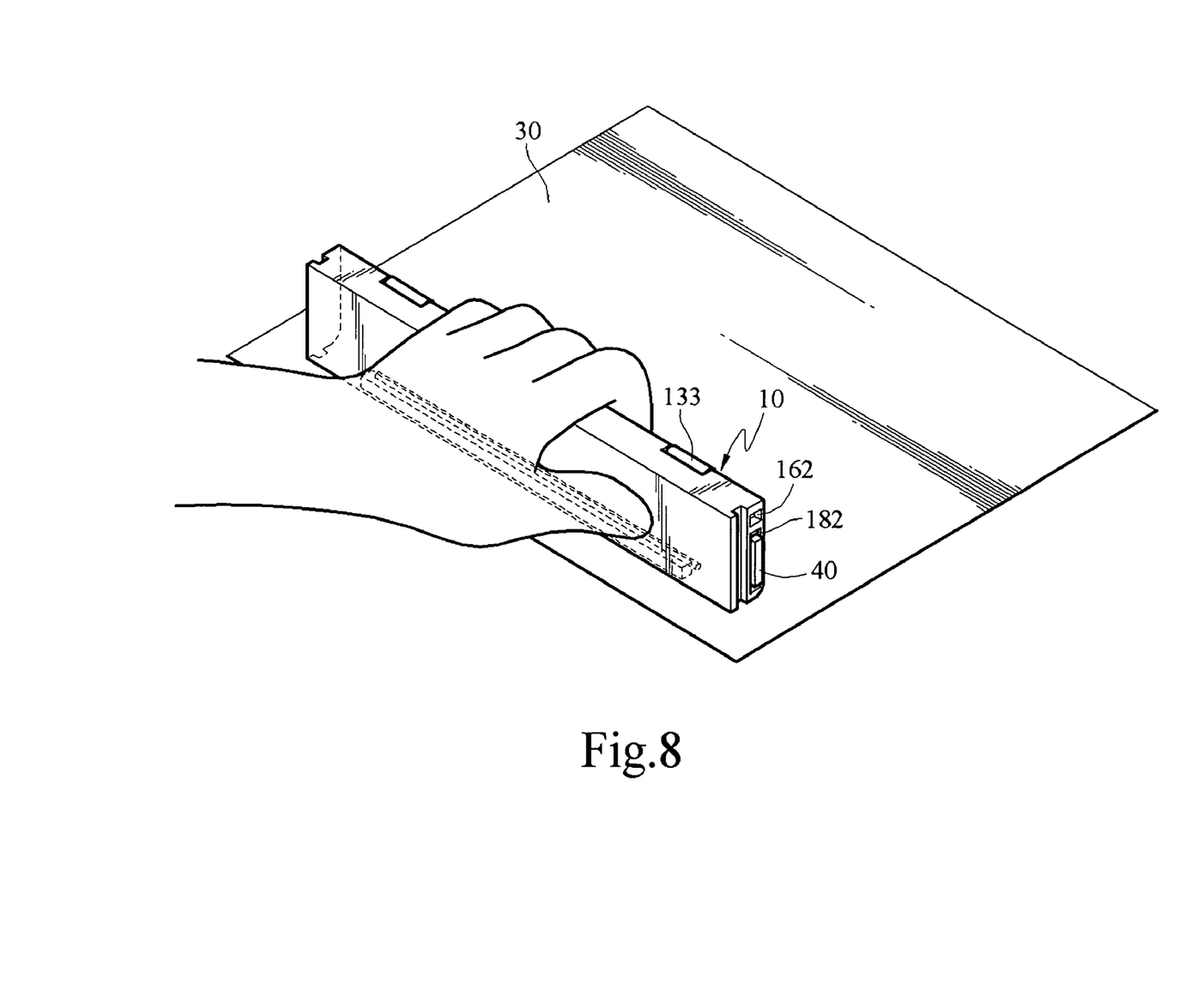
FIG. 8 is a schematic view of the third embodiment of the present invention in use.

As shown in FIG. 8, the power supply apparatus of the third embodiment of the present invention stores the image data into the internal memory 181 or the external memory 40. When the power supply apparatus 10 is detached from the portable electronic device 20, the battery pack 11 supplies power required by the scanning module 12, and the image data are directly stored in the internal memory 181 or the external memory 40. Thus the power supply apparatus 10 functions as a handheld scanning apparatus for scanning the object 30 to be scanned in a handheld operating manner.

Figure 9:
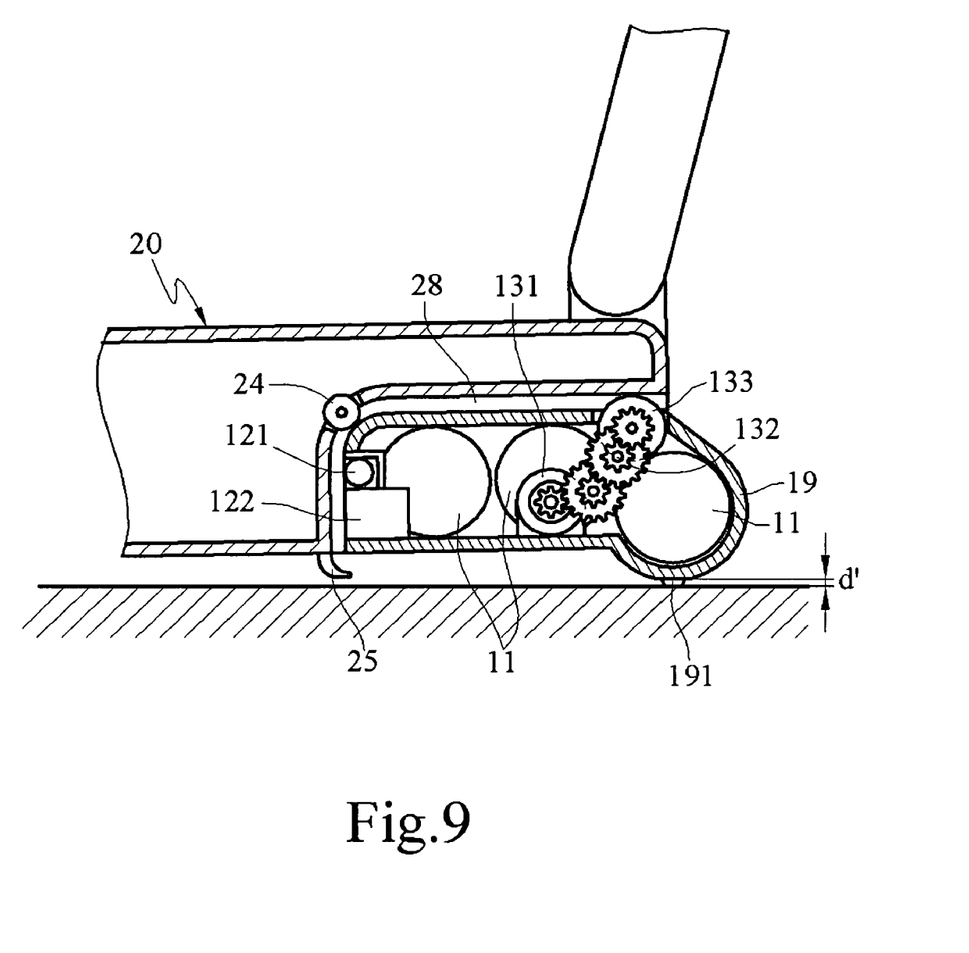
FIG. 9 is a sectional view of a fourth embodiment of the present invention in use.

As shown in FIG. 9, the power supply apparatus 10 of a fourth embodiment of the present invention has more battery cells 111 in the battery 11. Thus, the volume of the power supply apparatus 10 is increased, and the increased portion forms a protruding portion 19. A rubber pad 191 is disposed on two sides of the protruding portion 19 respectively. When the rubber pads 191 are combined with the power supply apparatus 10 having the protruding portion 19, the protruding portion 19 supports the portable electronic device 20 to a certain height, so that a gap d' is formed between two rubber pads 191, permitting the object 30 to be scanned to pass through. Thus, the foot supports are not required in the portable electronic device 20 combined with the power supply apparatus 10 having the protruding portion 19.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A power supply apparatus, provided for being installed into a battery slot of a portable electronic device to supply power and to scan, the power supply apparatus comprising:
a scanning module, for scanning an object to be scanned and converting an image of the object into image data, wherein the scanning module is electrically connected to a signal connector, so as to be electrically connected to a communication port of the portable electronic device; and
a battery pack, electrically connected to a power connector, so as to be electrically connected to a power connection port of the portable electronic device, for supplying power to the portable electronic device and supplying power to the scanning module;
wherein a moving path is formed by the power supply apparatus together with an inner side of the battery slot of the portable electronic device, the object to be scanned moves along the moving path to pass through the scanning module, and the image of the object is converted into the image data by the scanning module, and the image data is transmitted to the portable electronic device via the signal connector and the communication port.

2. The power supply apparatus as claimed in claim 1, wherein the scanning module comprises a light source, an image sensor, and a signal processor, the light source projects light onto the object to be scanned, the light reflected by the object to be scanned enters the image sensor and is converted into an electric signal, and the signal processor converts the electric signal into the image data.

3. The power supply apparatus as claimed in claim 1, wherein the battery pack is composed of one or more battery cells.

4. The power supply apparatus as claimed in claim 1, wherein the power supply apparatus further comprising a transmission assembly, electrically connected to the battery pack, and the transmission assembly comprises a motor, a gear set, and a pickup roller; wherein the gear set is engaged with the motor and the pickup roller respectively, such that the motor drives the pickup roller to rotate, and the object to be scanned after entering the moving path is driven by the pickup roller to move forward.

5. A power supply apparatus, provided for being installed into a battery slot of a portable electronic device to supply power and to scan, the power supply apparatus comprising:
a scanning module, for scanning an object to be scanned and converting an image of the object into image data, wherein the scanning module is electrically connected to a signal connector, so as to be electrically connected to a communication port of the portable electronic device;
a transmission assembly, for driving the object to be scanned to pass through the scanning module;
a battery pack, electrically connected to a switch, and electrically connected to a power supplier, the scanning module, and the transmission assembly via the switch, so as to selectively supply power to the portable electronic device or supply power to the scanning module or the transmission assembly; and
an internal memory, electrically connected to the scanning module;
wherein a moving path is formed by the power supply apparatus together with an inner side of the battery slot of the portable electronic device, the object to be scanned is driven by the transmission assembly to move along the moving path and to pass through the scanning module, and then the image of the object is converted into the image data by the scanning module, and the image data is transmitted to the portable electronic device via the signal connector and the communication port or is stored in the internal memory.

6. The power supply apparatus as claimed in claim 5, wherein the scanning module includes a light source, an image sensor, and a signal processor, the light source projects light onto the object to be scanned, the light reflected by the object to be scanned enters the image sensor and is converted into an electric signal, and the signal processor converts the electric signal into the image data.

7. The power supply apparatus as claimed in claim 5, wherein the battery pack is composed of one or more battery cells.

8. The power supply apparatus as claimed in claim 5, wherein the transmission assembly comprises a motor, a gear set, and a pickup roller, wherein the gear set is engaged with the motor and the pickup roller respectively, such that the motor drives the pickup roller to rotate, and the object to be scanned after entering the moving path is driven by the pickup roller to move forward.

9. The power supply apparatus as claimed in claim 5, further comprising an external slot electrically connected to the scanning module and connected to an external memory where the image data is optionally stored.

* * * * *